(12) United States Patent
Wu

(10) Patent No.: US 7,809,274 B2
(45) Date of Patent: Oct. 5, 2010

(54) ELECTRONIC DEVICE WITH REFLECTION STRUCTURE FOR REFLECTING OPTICAL SIGNAL TO RECEIVER THEREOF

(75) Inventor: Cho-Ming Wu, Taipei County (TW)

(73) Assignee: Au Optronics Corporation, Science-Based Industrial Park, Hsinchu (TW)

( * ) Notice: Subject to any disclaimer, the term of this patent is extended or adjusted under 35 U.S.C. 154(b) by 748 days.

(21) Appl. No.: 11/616,036

(22) Filed: Dec. 26, 2006

(65) Prior Publication Data

US 2008/0031632 A1 Feb. 7, 2008

(30) Foreign Application Priority Data

Jul. 28, 2006 (TW) .............................. 95127858 A

(51) Int. Cl.
*H04B 10/00* (2006.01)
(52) U.S. Cl. ........................ 398/130; 398/131; 398/106; 398/114; 398/112
(58) Field of Classification Search ......... 398/106–108, 398/114, 118, 140, 130, 131, 112, 122
See application file for complete search history.

(56) References Cited

U.S. PATENT DOCUMENTS

| 5,389,967 | A | * | 2/1995 | Kim ............................ 348/169 |
| 5,452,135 | A | * | 9/1995 | Maki et al. .................. 359/834 |
| 5,739,875 | A | * | 4/1998 | Toide et al. ................. 348/744 |
| 5,894,278 | A | * | 4/1999 | Kubo et al. ............. 340/825.72 |
| 6,115,161 | A | * | 9/2000 | Cho ............................ 398/129 |
| 6,661,473 | B1 | * | 12/2003 | Teshima et al. ............. 348/787 |
| 6,882,358 | B1 | * | 4/2005 | Schuster et al. .......... 348/14.16 |
| 6,944,403 | B2 | * | 9/2005 | Margalit et al. ............. 398/129 |
| 7,039,326 | B1 | * | 5/2006 | Chung ........................ 398/202 |
| 7,436,460 | B2 | * | 10/2008 | Glazier ....................... 348/734 |
| 2004/0193647 | A1 | * | 9/2004 | Ueda et al. ............... 707/104.1 |
| 2005/0196134 | A1 | * | 9/2005 | Lee ............................. 386/46 |

FOREIGN PATENT DOCUMENTS

| CN | 1574708 A | 2/2005 |
| JP | 3236528 | 10/1991 |
| JP | 563651 | 3/1993 |
| TW | 169716 | 9/1991 |
| TW | M254736 | 1/2005 |
| TW | 1227605 | 2/2005 |
| TW | 1254236 | 5/2006 |
| TW | 1286484 | 9/2007 |

* cited by examiner

*Primary Examiner*—Ken N Vanderpuye
*Assistant Examiner*—Hibret A Woldekidan
(74) *Attorney, Agent, or Firm*—Winston Hsu; Scott Margo; Min-Lee Teng

(57) ABSTRACT

The electronic device includes a device housing, an emitter, a receiver, and a reflection structure. The emitter is separated from the device housing and emits an optical signal. The receiver is disposed on the device housing for receiving the optical signal. The reflection structure is formed on the device housing and neighboring to the receiver. When the emitter is disposed in front of the device housing, the optical signal transmitted from the emitter is reflected by the reflection structure, and then the optical signal travels toward the receiver.

11 Claims, 15 Drawing Sheets

ELECTRONIC DEVICE WITH REFLECTION STRUCTURE FOR REFLECTING OPTICAL SIGNAL TO RECEIVER THEREOF

BACKGROUND OF THE INVENTION

1. Field of the Invention

The present invention relates to an electronic device, and more particularly, to an electronic device having a reflection structure formed on its device housing to reflect an optical signal to a receiver also disposed on the device housing.

2. Description of the Prior Art

Presently, many electronic devices are accompanied with remote controllers for users to control the device at great distances. These devices may include: liquid crystal display televisions (LCD TVs), notebook computers, air conditioners, and home audio-video (AV) systems. Typical control commands are power on/off, volume up/down, and channel up/down, for example. Remote controllers are emitters capable of emitting an optical signal, where the optical signal is usually an infrared ray. Thus remote controllers can send control signals or any other signals to electronic devices via the infrared ray. Accordingly, the electronic device should have an infrared ray receiver corresponding to the remote controller.

Usually, the electronic device has an opening disposed on its front cover, with the opening covered by a semi-transparent plastic cover. The infrared ray receiver is thus disposed within a screen housing of the electronic device and near the opening. Additionally, the plastic cover is typically dark red for the infrared ray to pass through effectively. Thus, the user of the electronic device cannot see the infrared ray receiver behind the plastic cover. The plastic cover, however, cannot be freely painted to other colors to fit the color of the screen housing.

Moreover, assembling the plastic cover within the opening requires considerable time and labor cost. Because the opening is conventionally designed on the front cover, the emitter should be used in front of the electronic device within an angular range of 90 degrees (i.e. 45 degrees to the left and right respectively). This is very inconvenient for users. Therefore, the electronic device can be improved to increase functionality and convenience.

SUMMARY OF THE INVENTION

It is therefore one of the objectives of the present invention to provide an electronic device to solve the above mentioned problems of the prior art. The electronic device comprises a device housing; an emitter for emitting an optical signal, and the emitter being separated from the device housing; a receiver disposed on the device housing for receiving the optical signal; and a reflection structure formed on the device housing and neighboring to the receiver; wherein when the emitter is disposed in front of the device housing, the optical signal transmitted from the emitter is reflected by the reflection structure, and then the optical signal travels toward the receiver.

These and other objectives of the present invention will no doubt become obvious to those of ordinary skill in the art after reading the following detailed description of the preferred embodiment that is illustrated in the various figures and drawings.

DETAILED DESCRIPTION

It should be noted that although display devices (i.e. electronic devices having display units) are provided as examples in the following five embodiments, it is not meant to be a limitation of the present invention. After reading the following detailed description of the various embodiments, those skilled in the art can easily replace the display units with other electronic units, such as audio/video (AV) units, central processing units (CPUs), etc. Thus the principles of the present invention can also be applied to other electronic devices, such as notebook computers, air conditioners, home AV systems, etc. Briefly speaking, the present invention provides an electronic device having a reflection structure formed on its device housing to reflect an optical signal to a receiver also disposed on the device housing.

Figure 1:
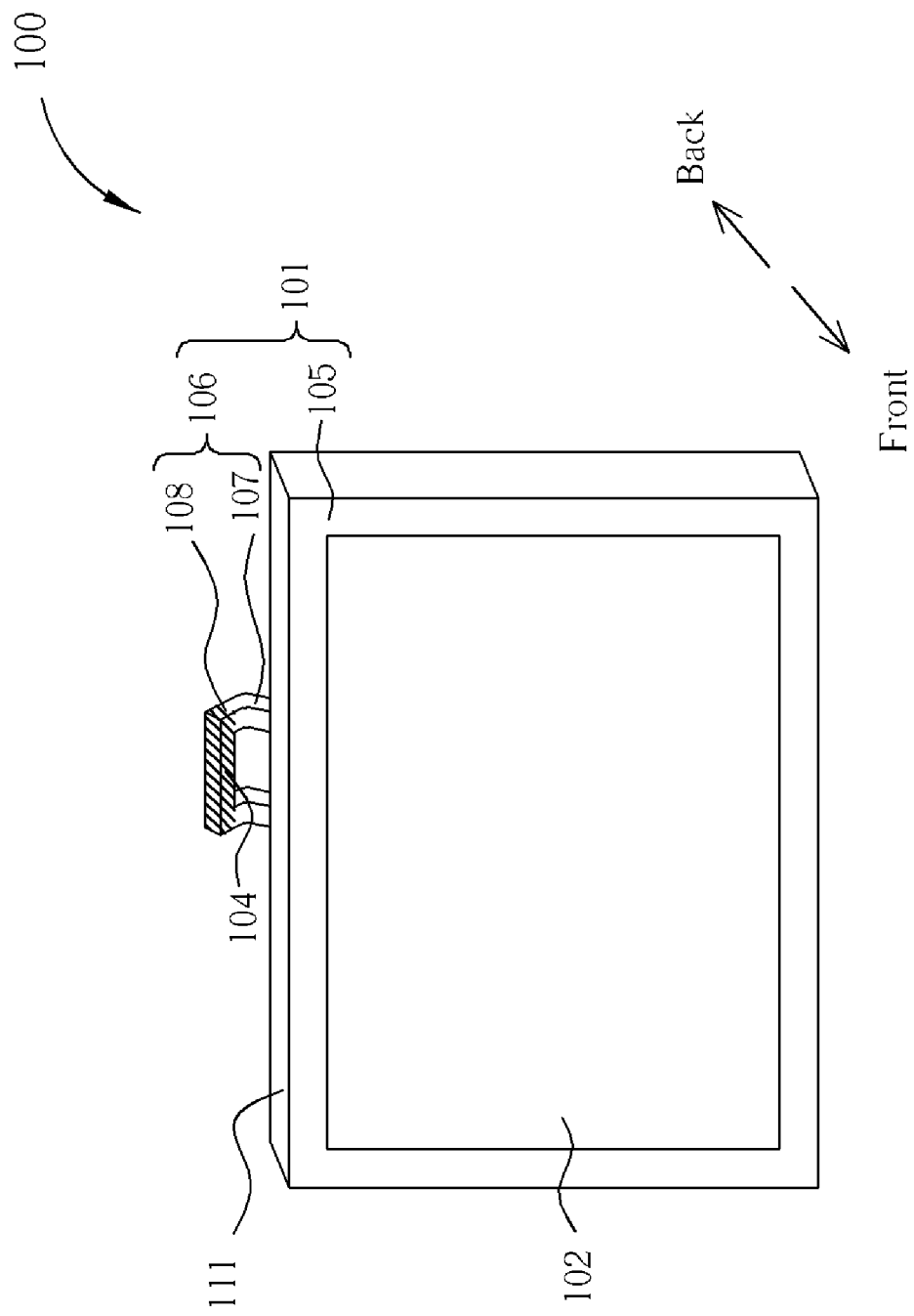
FIG. 1 is a three-dimensional front view of an electronic device according to a first embodiment of the present invention.
Figure 2:
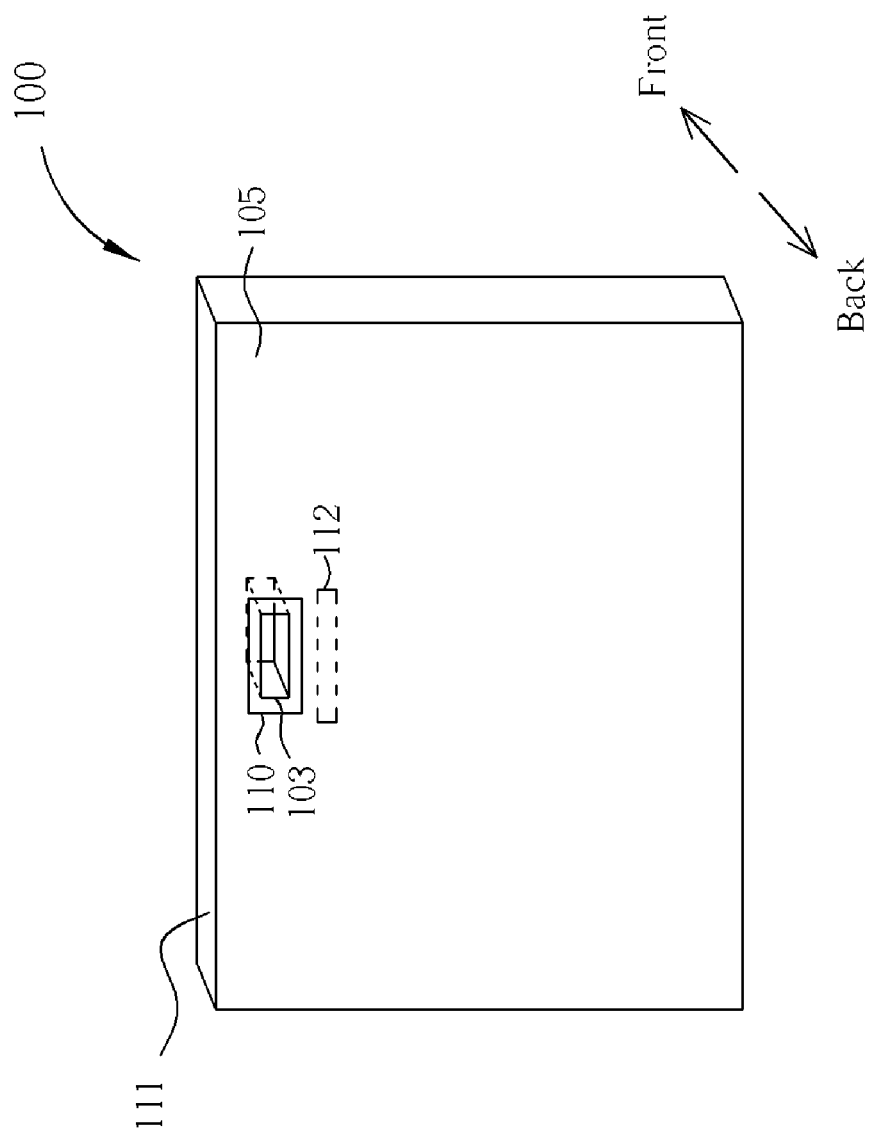
FIG. 2 is a three-dimensional back view of the electronic device in FIG. 1.
Figure 3:
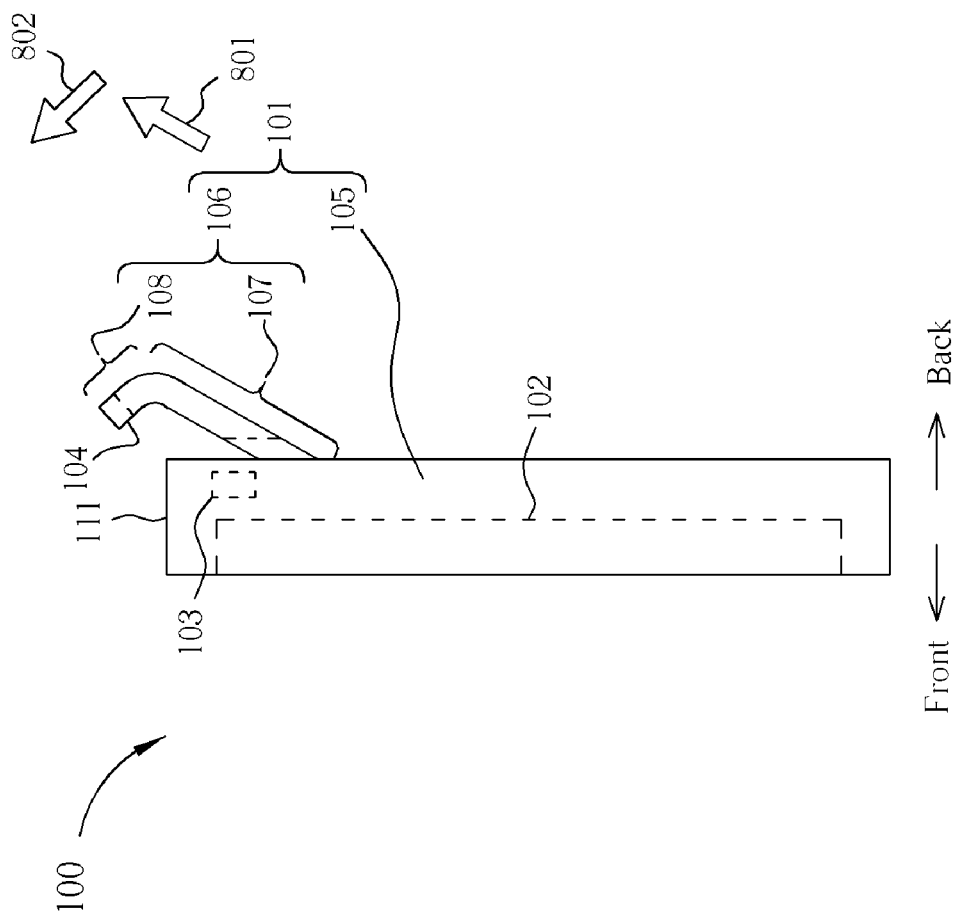
FIG. 3 is a lateral view of the electronic device in FIG. 1.
Figure 4:
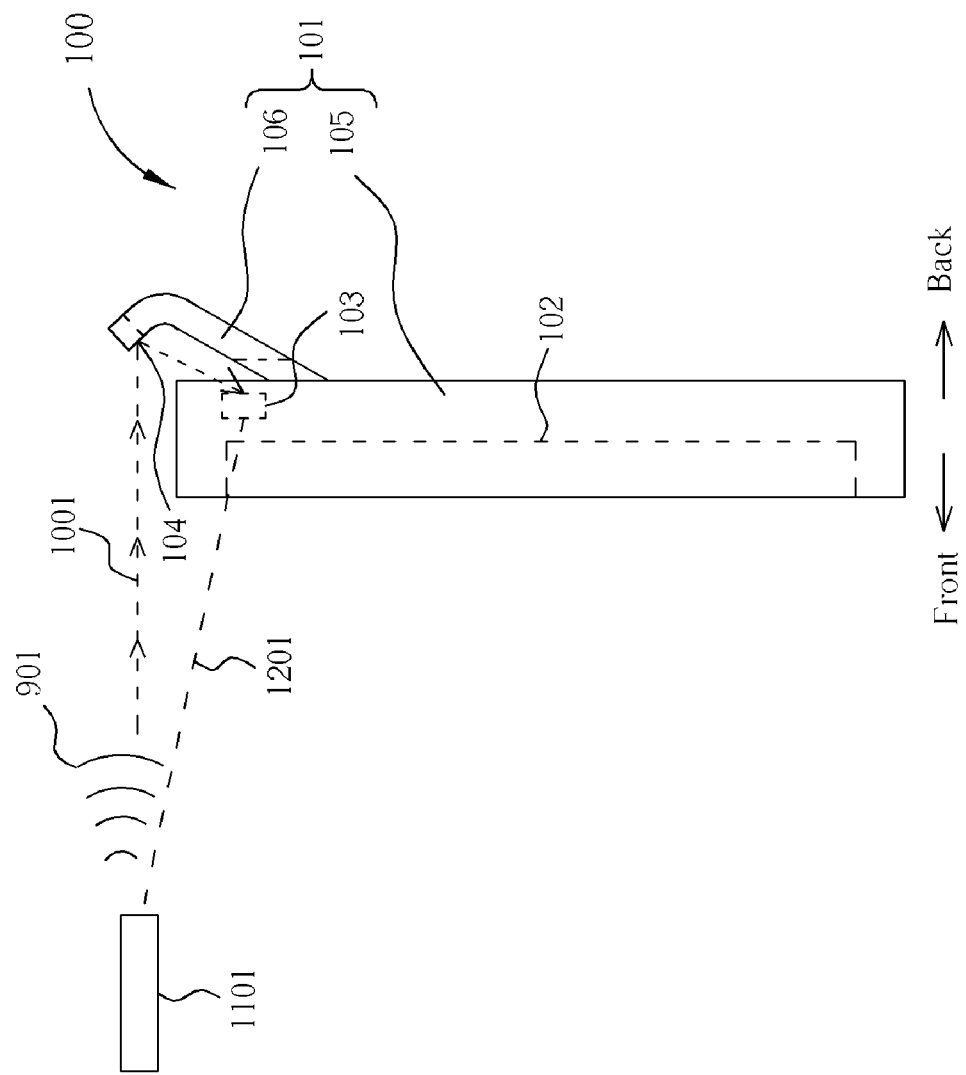
FIG. 4 is a schematic diagram illustrating the electronic device in FIG. 3 receiving an optical signal.

FIG. 1 is a three-dimensional front view of an electronic device 100 according to a first embodiment of the present invention. FIG. 2 is a three-dimensional back view of the electronic device 100 of FIG. 1, wherein an extending portion 106 is not shown for an unobstructed view. FIG. 3 is a lateral view of the electronic device 100 in FIG. 1. FIG. 4 is a schematic diagram illustrating the electronic device 100 of FIG. 3 receiving an optical signal 901, wherein the optical signal 901 travels from an emitter 1101 to a receiver 103 along a direction shown by an arrow 1001. Please refer to FIGS. 1-4 for the following description.

In this embodiment, the electronic device 100 comprises a device housing 101, an emitter 1101, a display unit 102, a receiver 103, a reflection structure 104, and a blocking structure. The device housing 101 substantially comprises a screen housing 105 and an extending portion 106. The emitter 1101 is separated from the device housing 101 for emitting an optical signal 901. The display unit 102 is a liquid crystal display (LCD) panel disposed inside the screen housing 105 for displaying an image signal transmitted from a television (TV) signal provider, a computer, or any other electronic device.

The extending portion 106 is connected to the screen housing 105 and has a first segment 107 and a second segment 108. The first segment 107 is connected to the screen housing 105 and extends outwards from the screen housing 105 along a first direction 801. The second segment 108 extends outwards from the first segment 107 along a second direction 802, different from the first direction 801, to surpass an outer edge 111 of the screen housing 105. Furthermore, as shown in FIG. 1, the second segment 108 has a horizontal extending part (as indicated by oblique lines in FIG. 1). Additionally, the extending portion 106 has a hollow portion. Therefore, a user of the electronic device 100 can hold the horizontal extending part to utilize the extending portion 106 as a grip.

The receiver 103 is disposed inside the screen housing 105. The screen housing 105 has an opening 110 (as shown in FIG. 2 where a connection between the extending portion 106 and the screen housing 105 is indicated by a dash line 112) and the outer edge 111. The receiver 103 corresponds to the opening 110. The reflection structure 104 is disposed on the second segment 108. Moreover, the reflection structure 104 is neighboring to the receiver 103. When the user is in front of the device housing 101, the user will see the reflection structure 104 outside of the outer edge 111. Additionally, the front half of the screen housing 105 is positioned in front of the receiver 103 as indicated by a dash line 1201, and thus can be used as the blocking structure in this embodiment. Therefore, when the user is in front of the device housing 101, the user will only see the blocking structure which blocks the receiver 103 from user's sight. In other words, the optical signal 901 cannot travel from the emitter 1101 to the receiver 103 along the dash line 1201 directly. Moreover, the optical signal 901 must be reflected by the reflection structure 104 to reach the receiver 103 when the optical signal 901 travels from the emitter 1101 disposed in front of the electronic device 100 to the receiver 103. Additionally, the optical signal 901 straight travels from the reflection structure 104 to the receiver 103 through the opening 110.

Please refer to FIG. 4. When the optical signal 901 output from the emitter 1101 in front of the device housing 101 reaches the reflection structure 104, the reflection structure 104 will reflect the optical signal 901 to the receiver 103 (as shown by the arrow 1001), and thus the electronic device 100 can receive the optical signal 901 at the receiver 103. Additionally, in this embodiment, the optical signal 901 is an infrared ray, and the receiver 103 is an infrared ray receiver.

Figure 5:
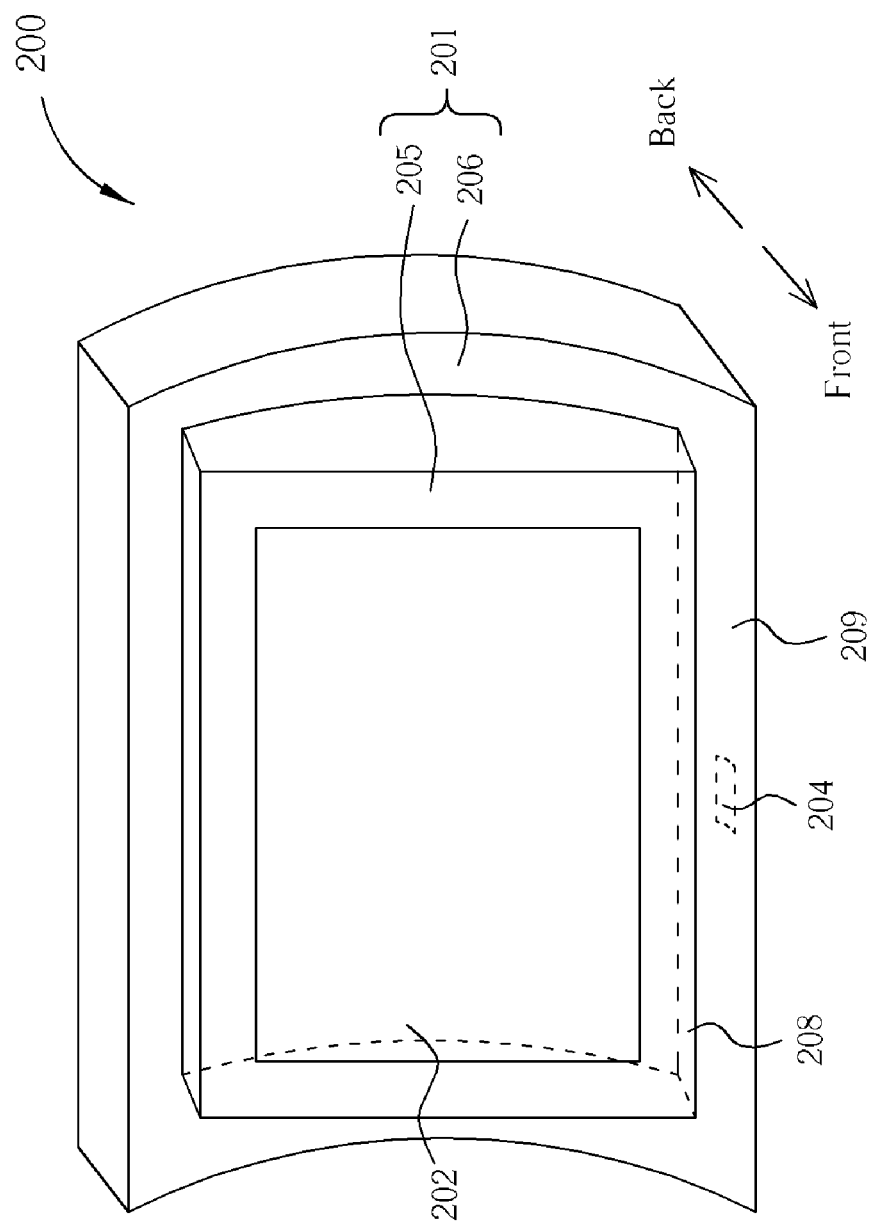
FIG. 5 is a three-dimensional view of an electronic device according to a second embodiment of the present invention.
Figure 6:
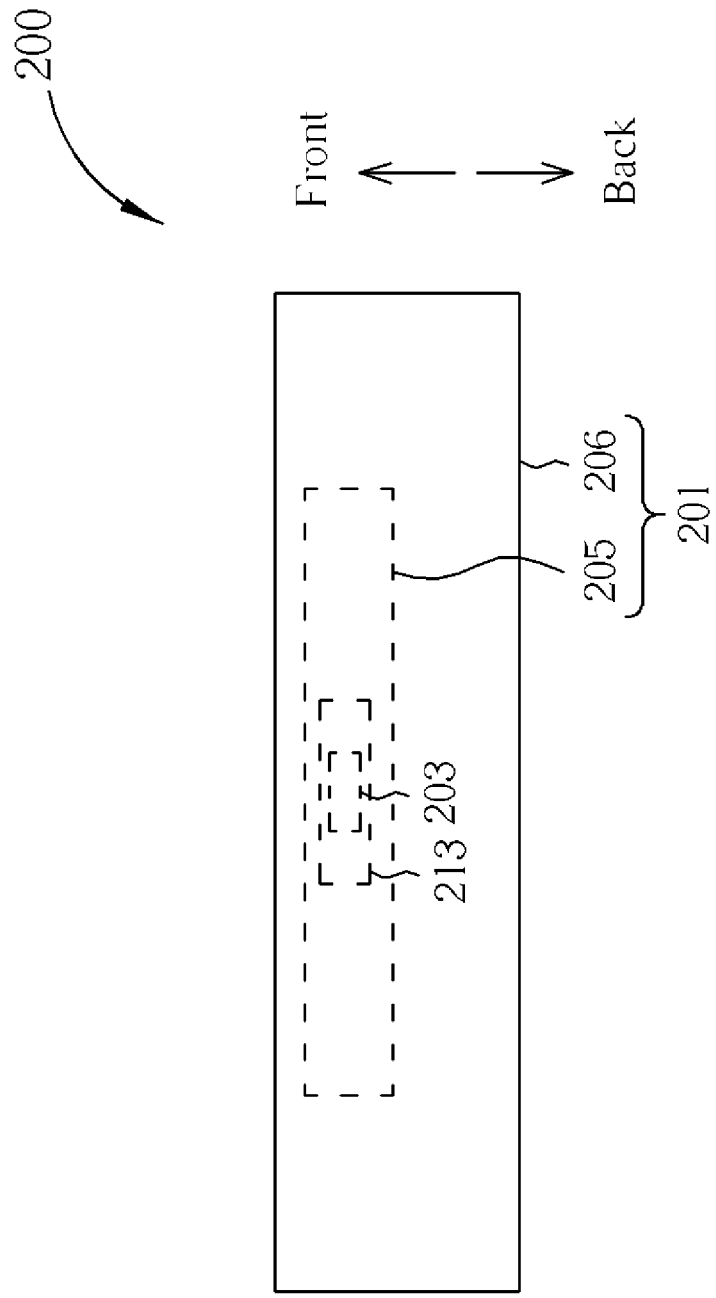
FIG. 6 is a bottom view of the electronic device in FIG. 5.
Figure 7:
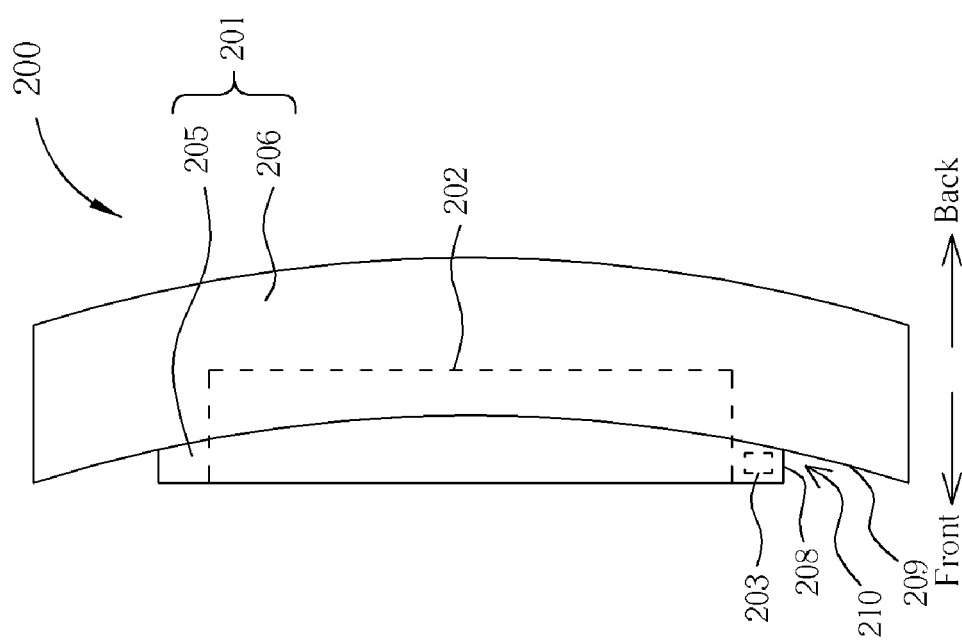
FIG. 7 is a lateral view of the electronic device in FIG. 5.
Figure 8:
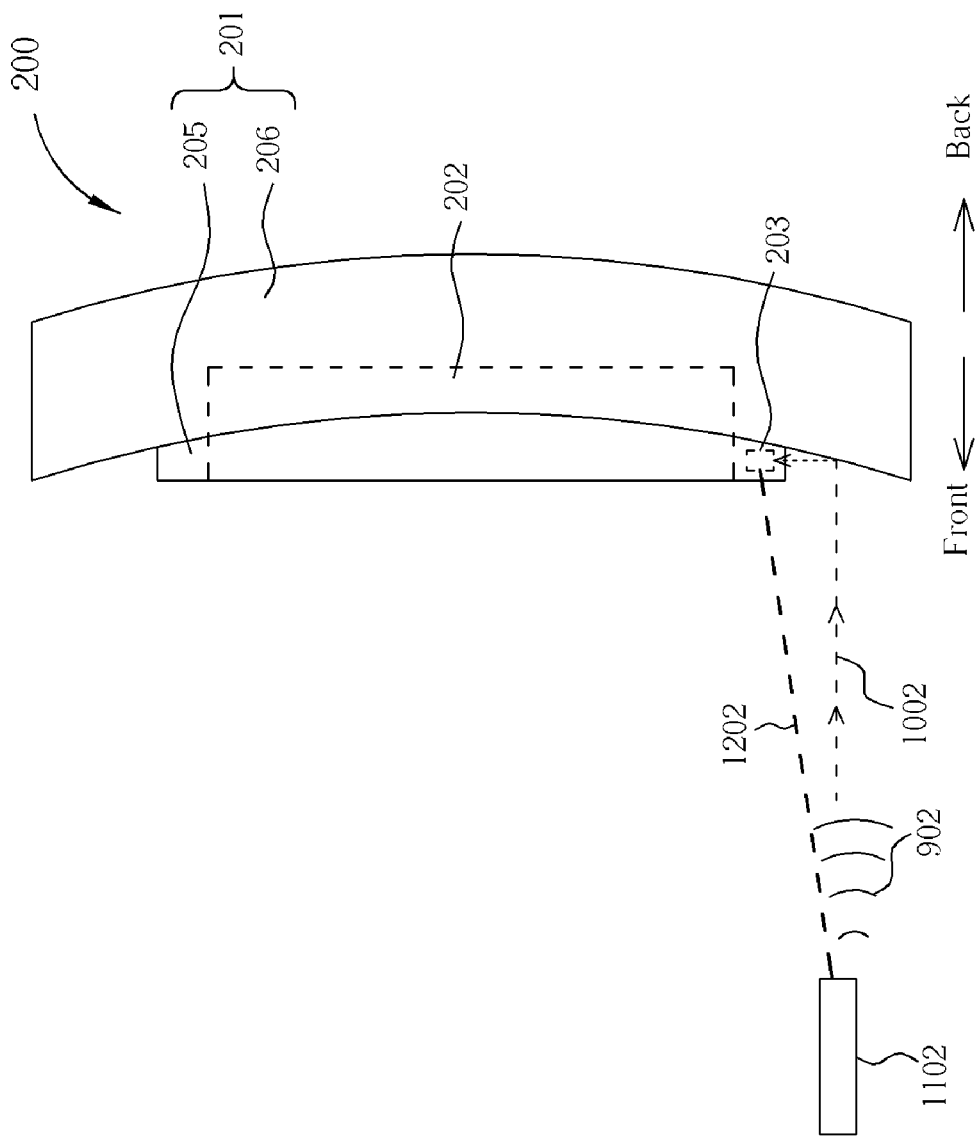
FIG. 8 is a schematic diagram illustrating the electronic device in FIG. 7 receiving an optical signal.

FIG. 5 is a three-dimensional view of an electronic device 200 according to a second embodiment of the present invention. FIG. 6 is a bottom view of the electronic device 200 in FIG. 5. FIG. 7 is a lateral view of the electronic device 200 in FIG. 5. FIG. 8 is a schematic diagram illustrating the electronic device 200 in FIG. 7 receiving an optical signal 902, wherein the optical signal 902 travels from an emitter 1102 to a receiver 203 along a direction shown by an arrow 1002. Please refer to FIGS. 5-8 for the following description.

In this embodiment, the electronic device 200 comprises a device housing 201, an emitter 1102, a display unit 202, a receiver 203, a reflection structure 204 (as indicated by a dash line in FIG. 5) and a blocking structure. The device housing 201 comprises a front cover 205 and a back cover 206. The emitter 1102 is separated from the device housing 201 for emitting an optical signal 902. The display unit 202 is a liquid crystal display (LCD) panel disposed inside an accommodation space formed by the front cover 205 and the back cover 206, and displays an image signal transmitted from a television (TV) signal provider, a computer, or any other electronic device.

The front cover 205 has a first connecting side 208, and the back cover 206 has a second connecting side 209. Furthermore, when the front cover 205 is connected to the back cover 206, the first connecting side 208 and the second connecting side 209 are connected to form a dented portion 210 (as shown in FIG. 7). Moreover, the dented portion 210 is positioned in a segmental gap between the front cover 205 and the back cover 206.

The receiver 203 is disposed inside the front cover 205 neighboring to the dented portion 210 of the first connecting side 208. Additionally, the front cover 205 has an opening 213 on the first connecting side 208. The receiver 203 corresponds to the opening 213. The reflection structure 204 is disposed in the dented portion 210 of the second connecting side 209 and neighboring to the receiver 203. Additionally, the lower half of the front cover 205 is positioned in front of the receiver 203 as indicated by a dash line 1202, and thus can be used as the blocking structure in this embodiment. Therefore, when a user of the electronic device 200 is in front of the device housing 201, the user will only see the blocking structure which blocks the receiver 203 from user's sight. In other words, the optical signal 902 cannot travel from the emitter 1102 to the receiver 203 along the dash line 1202 directly. Moreover, the optical signal 902 must be reflected by the reflection structure 204 to reach the receiver 203 when the optical signal 902 travels from the emitter 1102 disposed in front of the electronic device 200 to the receiver 203. Additionally, the optical signal 902 straight travels from the reflection structure 204 to the receiver 203 through the opening 213.

Please refer to FIG. 8. The reflection structure 204 has an appropriately curved surface. Thus, when the optical signal 902 output from the emitter 1102 in front of the device housing 201 reaches the reflection structure 204, the reflection structure 204 will reflect the optical signal 902 to the receiver 203 (as shown by the arrow 1002). Therefore the electronic device 200 can receive the optical signal 902 at the receiver 203. Additionally, in this embodiment, the optical signal 902 is an infrared ray, and the receiver 203 is an infrared ray receiver.

Figure 9:
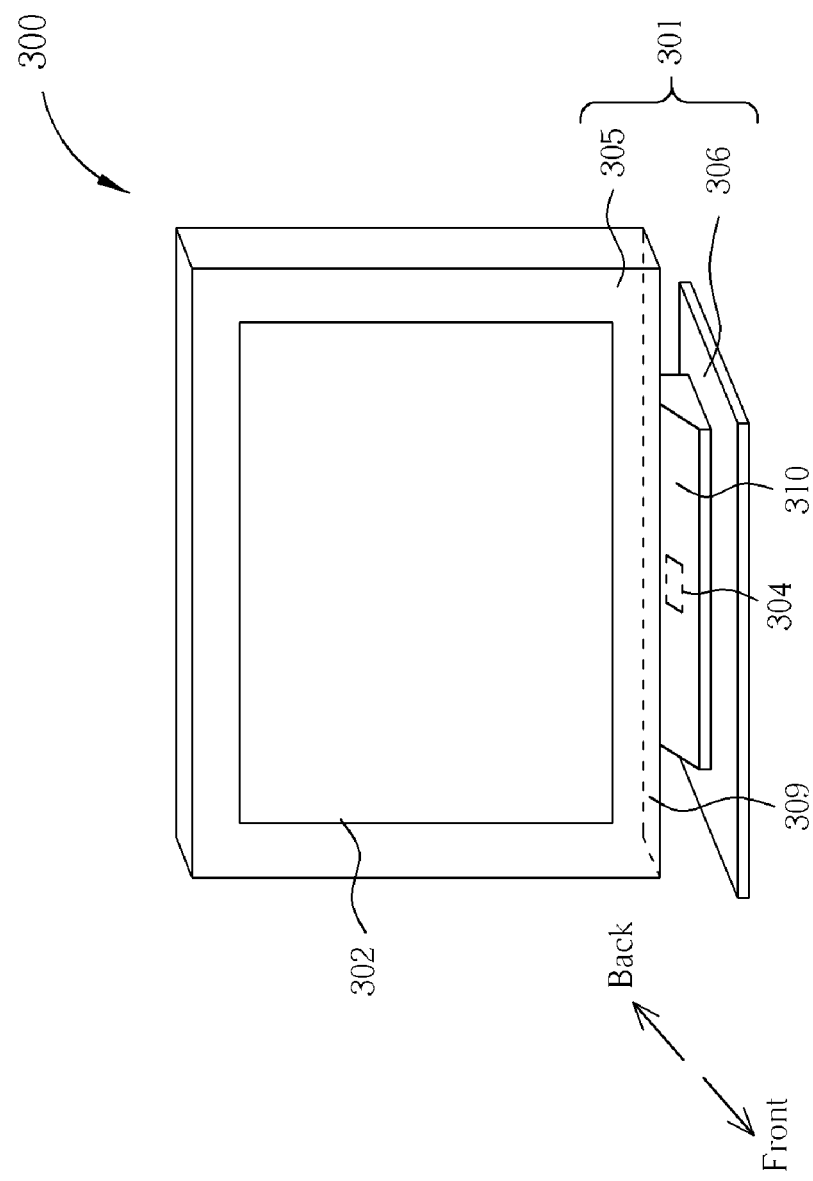
FIG. 9 is a three-dimensional view of an electronic device according to a third embodiment of the present invention.
Figure 10:
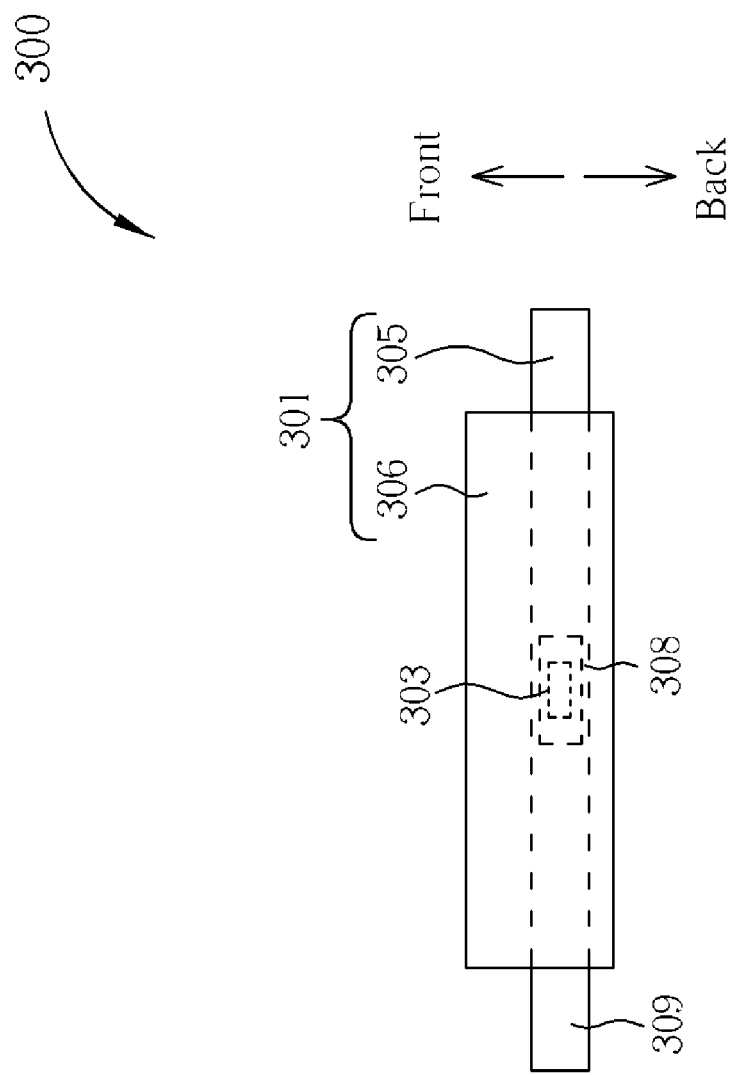
FIG. 10 is a bottom view of the electronic device in FIG. 9.
Figure 11:
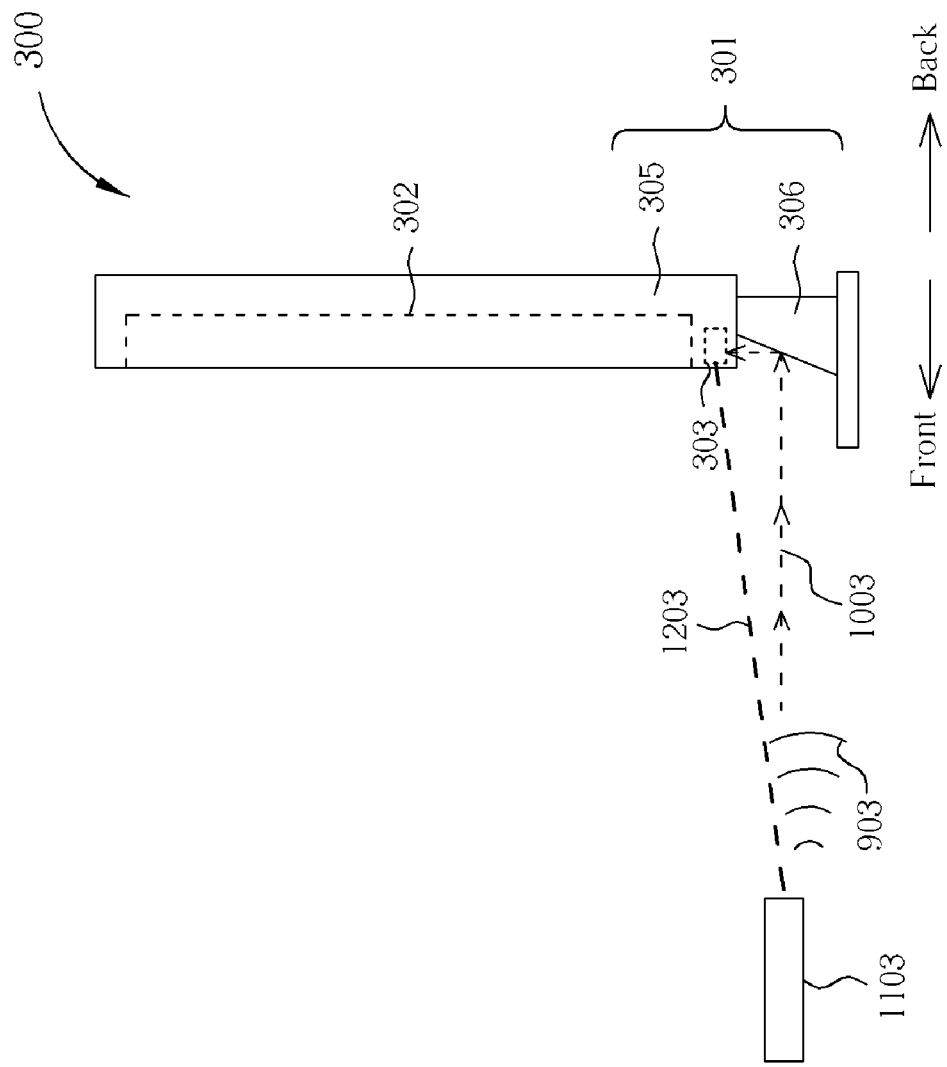
FIG. 11 is a schematic diagram illustrating the electronic device in FIG. 9 receiving an optical signal.

FIG. 9 is a three-dimensional view of an electronic device 300 according to a third embodiment of the present invention. FIG. 10 is a bottom view of the electronic device 300 in FIG. 9. FIG. 11 is a schematic diagram illustrating the electronic device 300 in FIG. 9 receiving an optical signal 903, wherein the optical signal 903 travels from an emitter 1103 to a receiver 303 along a direction shown by an arrow 1003. Please refer to FIGS. 9-11 for the following description.

In this embodiment, the electronic device 300 comprises a device housing 301, an emitter 1103, a display unit 302, a receiver 303, a reflection structure 304 (as indicated by a dash line in FIG. 9) and a blocking structure. The device housing 301 comprises a bottom base 306 and a screen housing 305. The bottom base 306 has an upper surface 310. The screen housing 305 is connected to and above the bottom base 306. Further, the screen housing 305 has a lower surface 309 opposite to the upper surface 310 of the bottom base 306. The emitter 1103 is separated from the device housing 301 for emitting an optical signal 903. The display unit 302 is a liquid crystal display (LCD) panel disposed inside the screen housing 305 for displaying an image signal transmitted from a television (TV) signal provider, a computer, or any other electronic device.

The receiver 303 is disposed on the lower surface 309 inside the screen housing 305. The screen housing 305 has an opening 308. The receiver 303 corresponds to the opening 308. The reflection structure 304 is disposed on the upper surface 310 of the bottom base 06. The reflection structure 304 is directly below the receiver 303. Additionally, the front half of the screen housing 305 is positioned in front of the receiver 303 as indicated by a dash line 1203, and thus can be used as the blocking structure in this embodiment. Therefore, when a user of the electronic device 300 is in front of the device housing 301, the user will only see the blocking structure which blocks the receiver 303 from user's sight. In other words, the optical signal 903 cannot travel from the emitter 1103 to the receiver 303 along the dash line 1203 directly. Moreover, the optical signal 903 must be reflected by the reflection structure 304 to reach the receiver 303 when the optical signal 903 travels from the emitter 1103 disposed in front of the electronic device 300 to the receiver 303. Additionally, the optical signal 903 straightly travels from the reflection structure 304 to the receiver 303 through the opening 308.

Please refer to FIG. 11. When the optical signal 903 output from the emitter 1103 in front of the device housing 301 reaches the reflection structure 304, the reflection structure 304 will reflect the optical signal 903 to the receiver 303 (as shown by the arrow 1003), and thus the electronic device 300 can receive the optical signal 903 by the receiver 303. Additionally, in this embodiment, the optical signal 903 is an infrared ray, and the receiver 303 is an infrared ray receiver.

Figure 12:
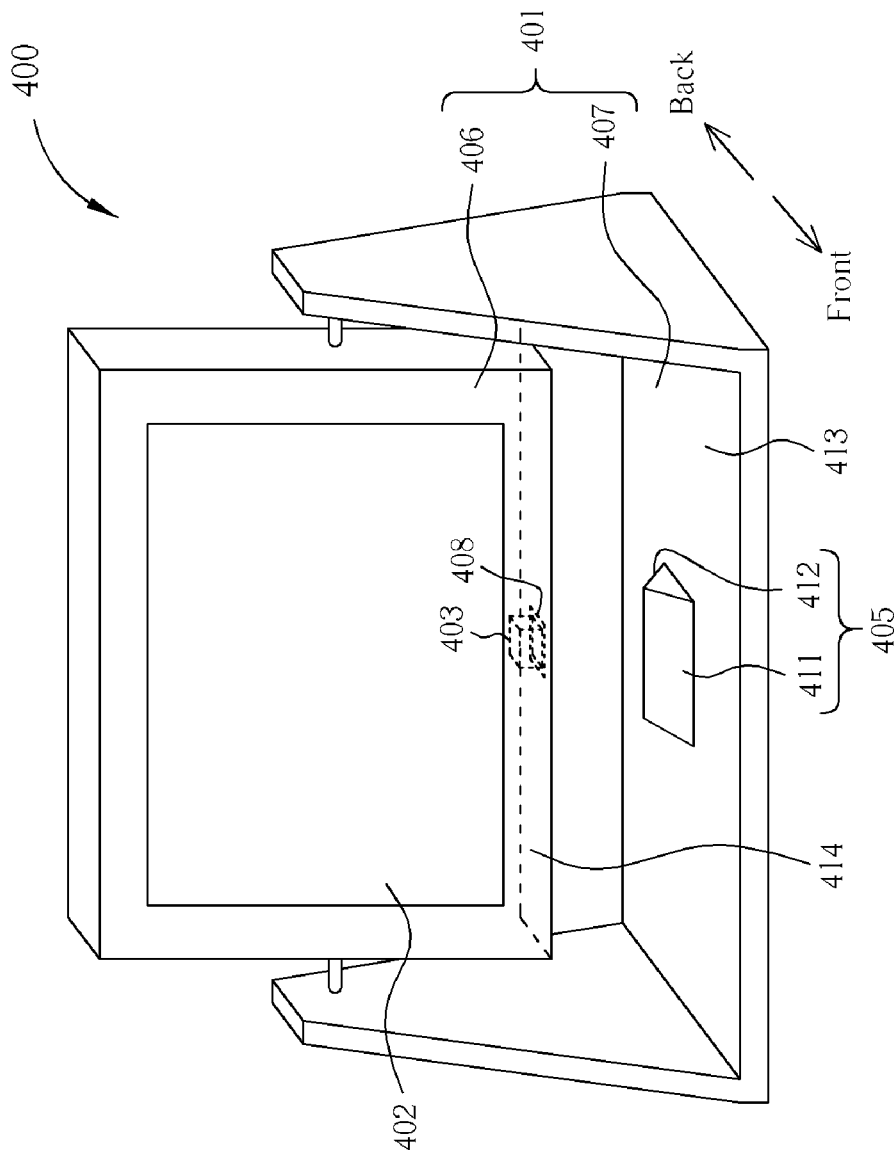
FIG. 12 is a three-dimensional view of an electronic device according to a fourth embodiment of the present invention.
Figure 13:
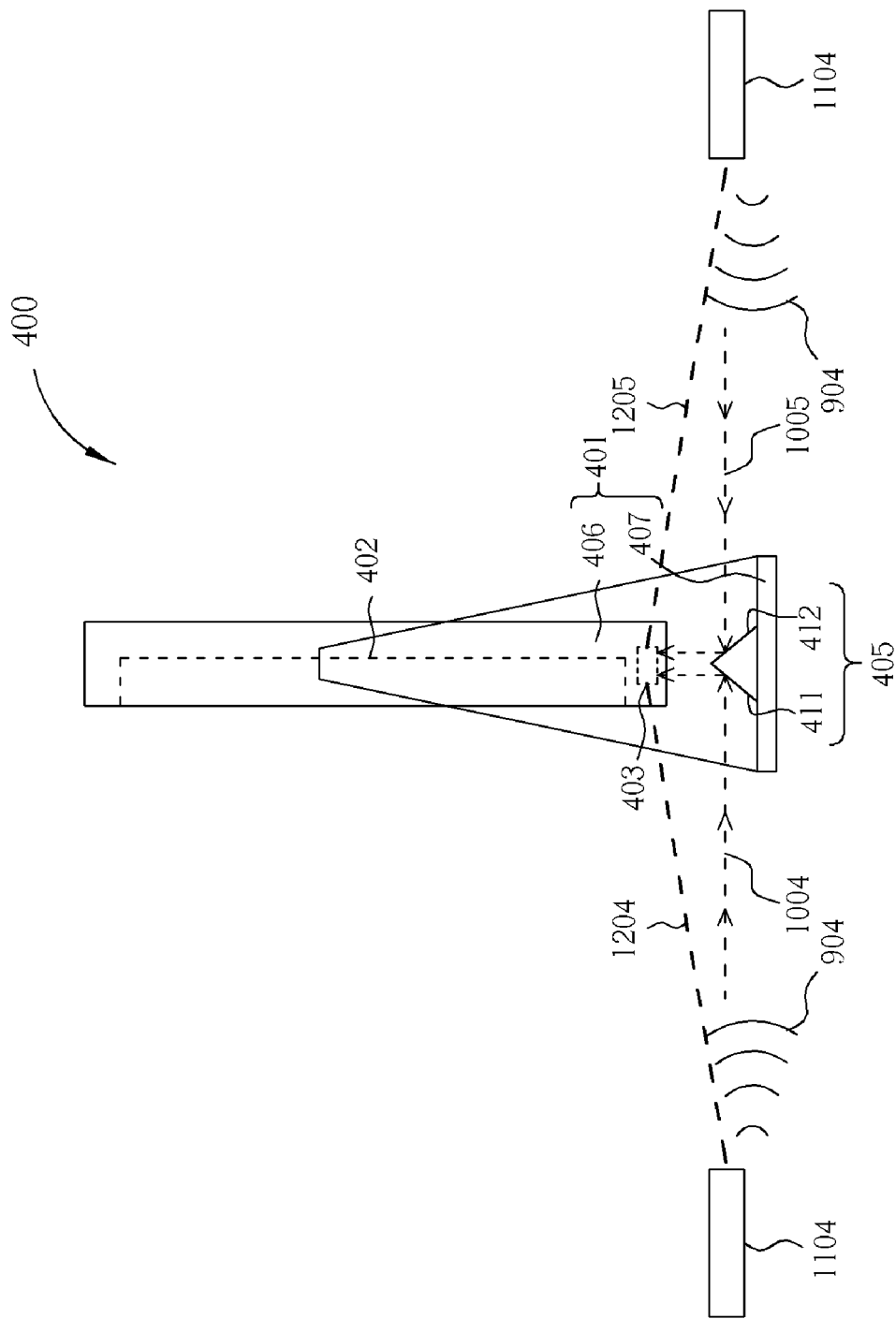
FIG. 13 is a schematic diagram illustrating the electronic device in FIG. 12 receiving an optical signal.

FIG. 12 is a three-dimensional view of an electronic device 400 according to a fourth embodiment of the present invention. FIG. 13 is a schematic diagram illustrating the electronic device 400 in FIG. 12 receiving an optical signal 904. Please refer to FIGS. 12 and 13 for the following description.

In this embodiment, the electronic device 400 comprises a device housing 401, an emitter 1104, a display unit 402, a receiver 403, a reflection structure 405 and a blocking structure. The device housing 401 comprises a bottom base 407 and a screen housing 406. The bottom base 407 has an upper surface 413. The screen housing 406 is connected to the bottom base 407 and is positioned above it. Furthermore, the screen housing 406 has a lower surface 414 opposite to the upper surface 413 of the bottom base 407. The emitter 1104 is separated from the device housing 401, and emits an optical signal 904. The display unit 402 is a liquid crystal display (LCD) panel disposed inside the screen housing 406 for displaying an image signal transmitted from a television (TV) signal provider, a computer, or any other electronic device.

The receiver 403 is disposed on the lower surface 414 inside the screen housing 406. The screen housing 406 has an opening 408, and the receiver 403 corresponds to the opening 408. The reflection structure 405 is a triangular prism disposed on the upper surface 413 of the bottom base 407. The reflection structure 405 is directly below the receiver 403. Moreover, the reflection structure 405 has a first reflecting side 411 and a second reflecting side 412 being two substantially inclined planes. Specifically, the first reflecting side 411 and the second reflecting side 412 are two inclined lateral planes of the triangular prism facing front and back of the device housing 401 respectively. Additionally, the screen housing 406 can be used as the blocking structure in this embodiment.

When the emitter 1104 is disposed in front of the device housing 401, the front half of the screen housing 406, i.e. the blocking structure, is positioned in front of the receiver 403 as indicated by a dash line 1204. Therefore, when a user of the electronic device 400 is in front of the device housing 401, the user will only see the blocking structure which blocks the receiver 403 from user's sight. In other words, the optical signal 904 cannot travel from the emitter 1104 to the receiver 403 along the dash line 1204 directly. Moreover, the optical signal 904 must be reflected by the first reflecting side 411 of the reflection structure 405 to reach the receiver 403 when the optical signal 904 travels from the emitter 1104 to the receiver 403. Additionally, the optical signal 904 travels straight from the first reflecting side 411 of the reflection structure 405 to the receiver 403 through the opening 408. On the other hand, when the emitter 1104 is disposed behind the device housing 401, the back half of the screen housing 406, i.e. the blocking structure, is positioned behind the receiver 403 as indicated by a dash line 1205. Therefore, when the user is behind the device housing 401, the user will only see the blocking structure which blocks the receiver 403 from user's sight. In other words, the optical signal 904 cannot travel from the emitter 1104 to the receiver 403 along the dash line 1205 directly. Moreover, the optical signal 904 must be reflected by the second reflecting side 412 of the reflection structure 405 to reach the receiver 403 when the optical signal 904 travels from the emitter 1104 to the receiver 403. Additionally, the optical signal 904 travels straight from the second reflecting side 412 of the reflection structure 405 to the receiver 403 through the opening 408.

Please refer to FIG. 13. When the optical signal 904 output from the emitter 1104 in front of the device housing 401 reaches the first reflecting side 411 of the reflection structure 405, the first reflecting side 411 will reflect the optical signal 904 to the receiver 403 (as shown by the arrow 1004), and thus the electronic device 400 can receive the optical signal 904 at the receiver 403. Specifically speaking, when the emitter 1104 is disposed in front of the device housing 401, the optical signal 904 first travels substantially horizontally to the first reflecting side 411 of the reflection structure 405. Then the first reflecting side 411 reflects the optical signal 904 to travel substantially vertically upwards to the receiver 403. Furthermore, when the optical signal 904 output from the emitter 1104 behind the device housing 401 reaches the second reflecting side 412 of the reflection structure 405, the second reflecting side 412 will also reflect the optical signal 904 to the receiver 403 (as shown by the arrow 1005). Thus the electronic device 400 can also receive the optical signal 904 by the receiver 403. Specifically speaking, when the emitter 1104 is disposed behind the device housing 401, the optical signal 904 first travels substantially horizontally to the second reflecting side 412 of the reflection structure 405. The second reflecting side 412 then reflects the optical signal 904 to travel substantially vertically upwards to the receiver 403. Additionally, in this embodiment, the optical signal 904 is an infrared ray, and the receiver 403 is an infrared ray receiver.

Figure 14:
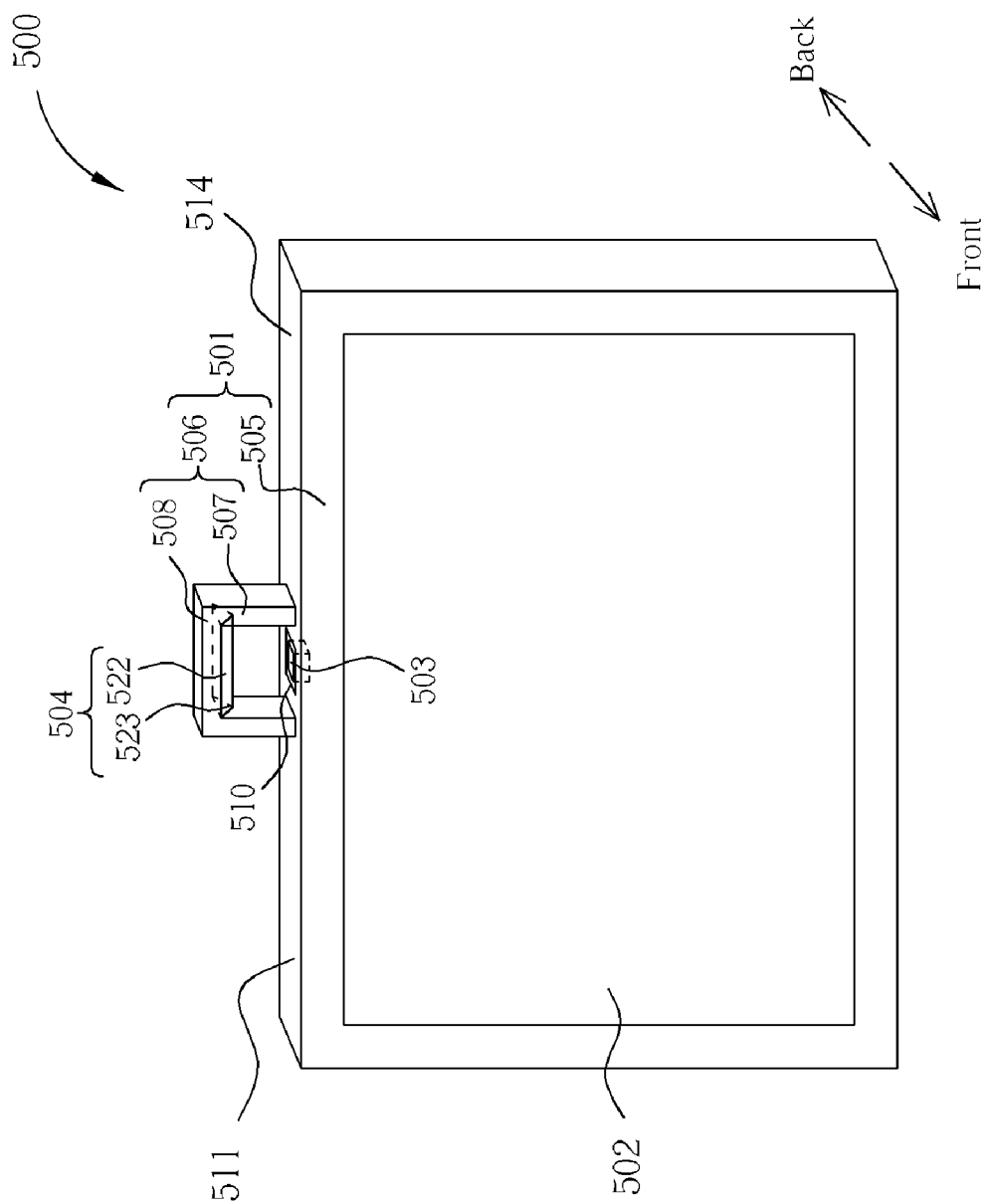
FIG. 14 is a three-dimensional view of an electronic device according to a fifth embodiment of the present invention.
Figure 15:
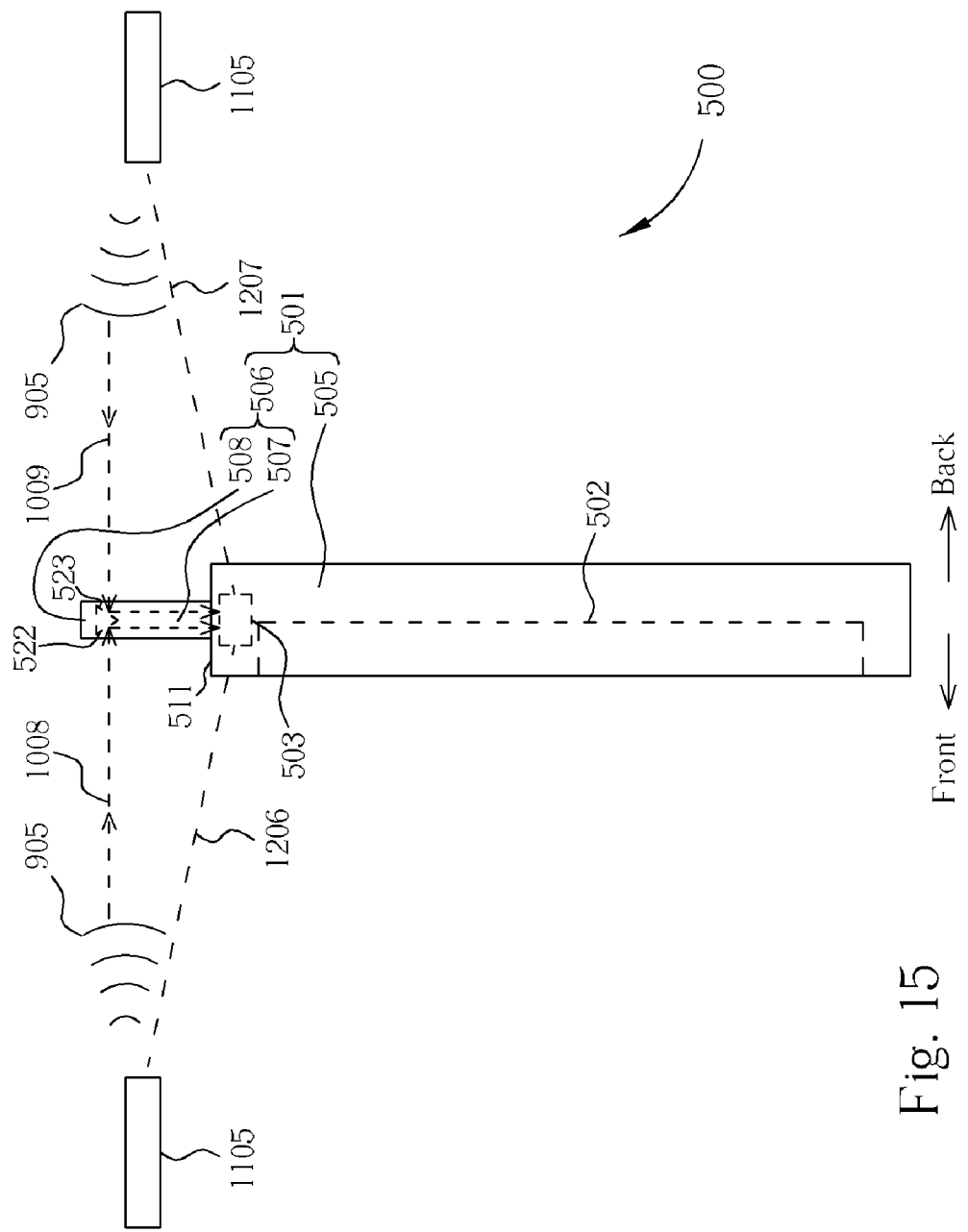
FIG. 15 is a schematic diagram illustrating the electronic device in FIG. 14 receiving an optical signal.

FIG. 14 is a three-dimensional view of an electronic device 500 according to a fifth embodiment of the present invention. FIG. 15 is a schematic diagram illustrating the electronic device 500 in FIG. 14 receiving an optical signal 905. Please refer to FIGS. 14 and 15 for the following description.

In this embodiment, the electronic device 500 comprises a device housing 501, an emitter 1105, a display unit 502, a receiver 503, a reflection structure 504 and a blocking structure. The device housing 501 comprises a screen housing 505 and an extending portion 506. The screen housing 505 has an outer edge 511. The emitter 1105 is separated from the device housing 501 for emitting an optical signal 905. The display unit 502 is a liquid crystal display (LCD) panel disposed inside the screen housing 505 for displaying an image signal transmitted from a television (TV) signal provider, a computer, or any other electronic device.

The extending portion 506 is connected to the screen housing 505 and has a first segment 507 and a second segment 508. The first segment 507 is connected to the screen housing 505 and extends outwards from the screen housing 505, allowing the second segment 508 to surpass the outer edge 511 of the screen housing 505. Moreover, as shown in FIG. 14, the extending portion 506 can be used as a handle.

The receiver 503 is disposed on an upper surface 514 inside the screen housing 505. The screen housing 505 has an opening 510, and the receiver 503 corresponds to the opening 510. The reflection structure 504 is disposed on the second segment 508 neighboring to the receiver 503. When a user of the electronic device 500 is in front of the device housing 501, the user will see the reflection structure 504 outside the outer edge 511. The reflection structure 504 has a first reflecting side 522 and a second reflecting side 523 being two substantially inclined planes. Specifically, the first reflecting side 522 and the second reflecting side 523 are two inclined lateral planes of the reflection structure 504 facing front and back of the device housing 501 respectively. Additionally, the screen housing 505 can be used as the blocking structure in this embodiment.

When the emitter 1105 is disposed in front of the device housing 501, the front half of the screen housing 505, i.e. the blocking structure, is positioned in front of the receiver 503 as indicated by a dash line 1206. Therefore, when the user is in front of the device housing 501, the user will only see the blocking structure which blocks the receiver 503 from user's sight. In other words, the optical signal 905 cannot travel from the emitter 1105 to the receiver 503 along the dash line 1206 directly. Moreover, the optical signal 905 must be reflected by the first reflecting side 522 of the reflection structure 504 to reach the receiver 503 when the optical signal 905 travels from the emitter 1105 to the receiver 503. Additionally, the optical signal 905 travels straight from the first reflecting side 522 of the reflection structure 504 to the receiver 503 through the opening 510. On the other hand, when the emitter 1105 is disposed behind the device housing 501, the back half of the screen housing 505, i.e. the blocking structure, is positioned behind the receiver 503 as indicated by a dash line 1207. Therefore, when the user is behind the device housing 501, the user will only see the blocking structure which blocks the receiver 503 from user's sight. In other words, the optical signal 905 cannot travel from the emitter 1105 to the receiver 503 along the dash line 1207 directly. Moreover, the optical signal 905 must be reflected by the second reflecting side 523 of the reflection structure 504 to reach the receiver 503 when the optical signal 905 travels from the emitter 1105 to the receiver 503. Additionally, the optical signal 905 travels straight from the second reflecting side 523 of the reflection structure 504 to the receiver 503 through the opening 510.

Please refer to FIG. 15. When the optical signal 905 output from the emitter 1105 in front of the device housing 501 reaches the first reflecting side 522 of the reflection structure 504, the first reflecting side 522 will reflect the optical signal 905 to the receiver 503 (as shown by the arrow 1008), allowing the electronic device 500 to receive the optical signal 905 at the receiver 503. Specifically speaking, when the emitter 1105 is disposed in front of the device housing 501, the optical signal 905 first travels substantially horizontally to the first reflecting side 522 of the reflection structure 504, and then the first reflecting side 522 reflects the optical signal 905 to travel substantially vertically downwards to the receiver 503. Furthermore, when the optical signal 905 output from the emitter 1105 behind the device housing 501 reaches the second reflecting side 523 of the reflection structure 504, the second reflecting side 523 will also reflect the optical signal 905 to the receiver 503 (as shown by the arrow 1009), and thus the electronic device 500 can also receive the optical signal 905 at the receiver 503. Specifically speaking, when the emitter 1105 is disposed behind the device housing 501, the optical signal 905 first travels substantially horizontally to the second reflecting side 523 of the reflection structure 504, and then the second reflecting side 523 reflects the optical signal 905 to travel substantially vertically downwards to the receiver 503. Additionally, in this embodiment, the optical signal 905 is an infrared ray, and the receiver 503 is an infrared ray receiver.

According to the present invention, a user either in front of or behind the display unit cannot see the receiver no matter where the receiver is located. Thus, the receiver (i.e. the infrared ray receiver) is effectively hidden. The semi-transparent plastic cover, utilized to hide the infrared ray receiver in the prior art, is not necessary. The time and manufacturing costs to assemble the plastic cover within the opening in the prior art can therefore further be saved.

Moreover, the electronic device of the present invention has a reflection structure formed on its device housing to reflect an optical signal (i.e. an infrared ray) to a receiver (i.e. an infrared ray receiver) also disposed on the device housing. Thus, the available operating range for an emitter can be effectively extended by modifying the position and shape of the reflection structure. Additionally, the emitter is free from previous limitations of only being useable while in a 90 degree front range (i.e. 45 degrees to the left and right respectively) of the electronic device. Specifically speaking, in the fourth and fifth embodiments, the user can operate the emitter in front of or behind the device housing of the electronic device to thereby greatly enhance functionality, convenience, and practicality of the electronic device.

Please note that the five embodiments described above are not meant to be limitations of the present invention. One of the main principles of the present invention is to reflect an optical signal from an emitter by any component (or a reflective portion) of an electronic device to a receiver of the electronic device. In this way, remote control operation of the electronic device is allowed. Additionally, the component (or the reflective portion) for reflecting the optical signal can be arranged in any position. For example, it can be arranged on the lateral sides, the back sides, the lower sides, etc, of the electronic device. The receiver can also be disposed in any position of the electronic device in accordance with the position of the reflective portion. Briefly speaking, neither the reflective portion nor the receiver is limited to be on the front side of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a device housing;
   an emitter for emitting an optical signal as a control signal for the electronic device, and the emitter being separated from the device housing;
   a receiver for receiving the optical signal, the receiver being disposed inside the device housing, and a top side of the receiver being shielded by the device housing; and
   a reflection structure formed on a surface of the device housing and neighboring to the receiver;
   wherein when the emitter is disposed in front of the device housing, the optical signal transmitted from the emitter is reflected by the reflection structure, and then the optical signal travels toward the receiver; and the device housing comprises:

a screen housing having an outer edge; and an extending portion having a first segment and a second segment, wherein the first segment is connected to the screen housing and extends outwards to allow the second segment to surpass the outer edge, the receiver is disposed on the screen housing, the reflection structure is disposed on the second segment, and when a user is in front of the device housing, the user will see the reflection structure outside the outer edge;

wherein the reflection structure has a first reflecting side and a second reflecting side being two inclined lateral planes of the reflection structure facing front and back of the device housing respectively; and when the emitter is disposed in front of the device housing, the optical signal transmitted from the emitter is reflected by the first reflecting side, and then the optical signal travels toward the receiver; and when the emitter is disposed behind the device housing, the optical signal transmitted from the emitter is reflected by the second reflecting side, and then the optical signal travels toward the receiver.

2. The electronic device of claim 1 further comprising a blocking structure formed on the device housing and positioned in front of the receiver, wherein when a user is in front of the device housing, the user will only see the blocking structure which blocks the receiver from user's sight; and the optical signal must be reflected by the reflection structure to reach the receiver when the optical signal travels from the emitter disposed in front of the electronic device.

3. The electronic device of claim 1, wherein the device housing has an opening, the receiver is disposed within the device housing and corresponds to the opening, and the optical signal travels straight from the reflection structure to the receiver through the opening.

4. The electronic device of claim 1, wherein the first segment extends from the screen housing along a first direction, the second segment extends from the first segment along a second direction to surpass the outer edge of the screen housing, the first direction and the second direction are different, the first segment or the second segment has a horizontal extending part, and the user can hold the horizontal extending part.

5. The electronic device of claim 1, wherein when the emitter is disposed in front of the device housing, the optical signal first travels substantially horizontally to the first reflecting side, and then the first reflecting side reflects the optical signal to travel substantially vertically downwards to the receiver; and when the emitter is disposed behind the device housing, the optical signal first travels substantially horizontally to the second reflecting side, and then the second reflecting side reflects the optical signal to travel substantially vertically downwards to the receiver.

6. An electronic device, comprising:

a device housing;

an emitter for emitting an optical signal as a control signal for the electronic device, the emitter being separated from the device housing;

a receiver for receiving the optical signal, the receiver being disposed inside the device housing, and a top side of the receiver being shielded by the device housing; and a reflection structure formed on a surface of the device housing and neighboring to the receiver, wherein the reflection structure is a triangular prism having a first reflecting side and a second reflecting side, the first reflecting side and the second reflecting side are two inclined lateral planes of the triangular prism facing front and back of the device housing respectively; when the emitter is disposed in front of the device housing, the optical signal transmitted from the emitter is reflected by the first reflecting side, and then the optical signal travels toward the receiver, and when the emitter is disposed behind the device housing, the optical signal transmitted from the emitter is reflected by the second reflecting side, and then the optical signal travels toward the receiver;

wherein when the emitter is disposed behind or in front of the device housing, the optical signal transmitted from the emitter is reflected by the reflection structure, and then the optical signal travels toward the receiver; and the device housing comprises:

a bottom base having an upper surface; and a screen housing connected to the bottom base, the screen housing positioned above the bottom base and having a lower surface opposite to the upper surface of the bottom base;

wherein the receiver is disposed on the lower surface of the screen housing, and the reflection structure is disposed on the upper surface of the bottom base.

7. An electronic device, comprising:

a device housing;

an emitter for emitting an optical signal, and the emitter being separated from the device housing;

a receiver disposed on the device housing for receiving the optical signal; and a reflection structure formed on the device housing and neighboring to the receiver;

wherein when the emitter is disposed in front of the device housing, the optical signal transmitted from the emitter is reflected by the reflection structure, and then the optical signal travels toward the receiver; and the device housing comprises:

a screen housing having an outer edge; and an extending portion having a first segment and a second segment, wherein the first segment is connected to the screen housing and extends outwards to allow the second segment to surpass the outer edge, the receiver is disposed on the screen housing, the reflection structure is disposed on the second segment, and when a user is in front of the device housing, the user will see the reflection structure outside the outer edge;

wherein the reflection structure has a first reflecting side and a second reflecting side being two inclined lateral planes of the reflection structure facing front and back of the device housing respectively; and when the emitter is disposed in front of the device housing, the optical signal transmitted from the emitter is reflected by the first reflecting side, and then the optical signal travels toward the receiver; and when the emitter is disposed behind the device housing, the optical signal transmitted from the emitter is reflected by the second reflecting side, and then the optical signal travels toward the receiver.

8. The electronic device of claim 7 further comprising a blocking structure formed on the device housing and positioned in front of the receiver, wherein when a user is in front of the device housing, the user will only see the blocking structure which blocks the receiver from user's sight; and the optical signal must be reflected by the reflection structure to reach the receiver when the optical signal travels from the emitter disposed in front of the electronic device.

9. The electronic device of claim 7, wherein the device housing has an opening, the receiver is disposed within the device housing and corresponds to the opening, and the optical signal travels straight from the reflection structure to the receiver through the opening.

10. The electronic device of claim 7, wherein the first segment extends from the screen housing along a first direction, the second segment extends from the first segment along a second direction to surpass the outer edge of the screen housing, the first direction and the second direction are different, the first segment or the second segment has a horizontal extending part, and the user can hold the horizontal extending part.

11. The electronic device of claim 7, wherein when the emitter is disposed in front of the device housing, the optical signal first travels substantially horizontally to the first reflecting side, and then the first reflecting side reflects the optical signal to travel substantially vertically downwards to the receiver; and when the emitter is disposed behind the device housing, the optical signal first travels substantially horizontally to the second reflecting side, and then the second reflecting side reflects the optical signal to travel substantially vertically downwards to the receiver.

* * * * *